United States Patent [19]

Austin

[11] 4,401,284
[45] Aug. 30, 1983

[54] COLLAPSIBLE MAGNUS-EFFECT ROTOR

[76] Inventor: Kenneth A. Austin, 3 Longlands Spinney, Worthing, West Sussex BN14 9LB, England

[21] Appl. No.: 244,622

[22] Filed: Mar. 17, 1981

[30] Foreign Application Priority Data

Mar. 20, 1980 [GB] United Kingdom ................. 8009369

[51] Int. Cl.³ ............................................. B64C 27/00
[52] U.S. Cl. ..................................... 244/21; 114/103; 244/10; 416/4
[58] Field of Search ...................... 440/8, 113; 244/10, 244/21; 114/103, 102, 39; 416/4

[56] References Cited

U.S. PATENT DOCUMENTS

Re. 18122  7/1931  Flettner ................................ 244/10

FOREIGN PATENT DOCUMENTS

| 416586 | 7/1925 | Fed. Rep. of Germany ........ 244/21 |
| 558426 | 9/1932 | Fed. Rep. of Germany ...... 114/102 |
| 2430630 | 4/1976 | Fed. Rep. of Germany ...... 114/102 |
| 219664 | 10/1925 | United Kingdom . |
| 221186 | 10/1925 | United Kingdom . |
| 244791 | 7/1926 | United Kingdom . |
| 264219 | 1/1927 | United Kingdom . |
| 245134 | 2/1927 | United Kingdom . |
| 1354026 | 5/1974 | United Kingdom . |

*Primary Examiner*—Sherman D. Basinger
*Attorney, Agent, or Firm*—Berman, Aisenberg & Platt

[57] ABSTRACT

A lift-producing arrangement suitable for driving a boat by the Magnus effect comprises an elongate tubular envelope mounted for rotation about its longitudinal axis. A drive is provided to rotate the envelope. The envelope is of flexible material, e.g., canvas, to achieve improved performance. Preferably, the envelope is held erect by inflation. The arrangement may be used in addition to a conventional screw-propulsion system for increased fuel economy.

3 Claims, 4 Drawing Figures

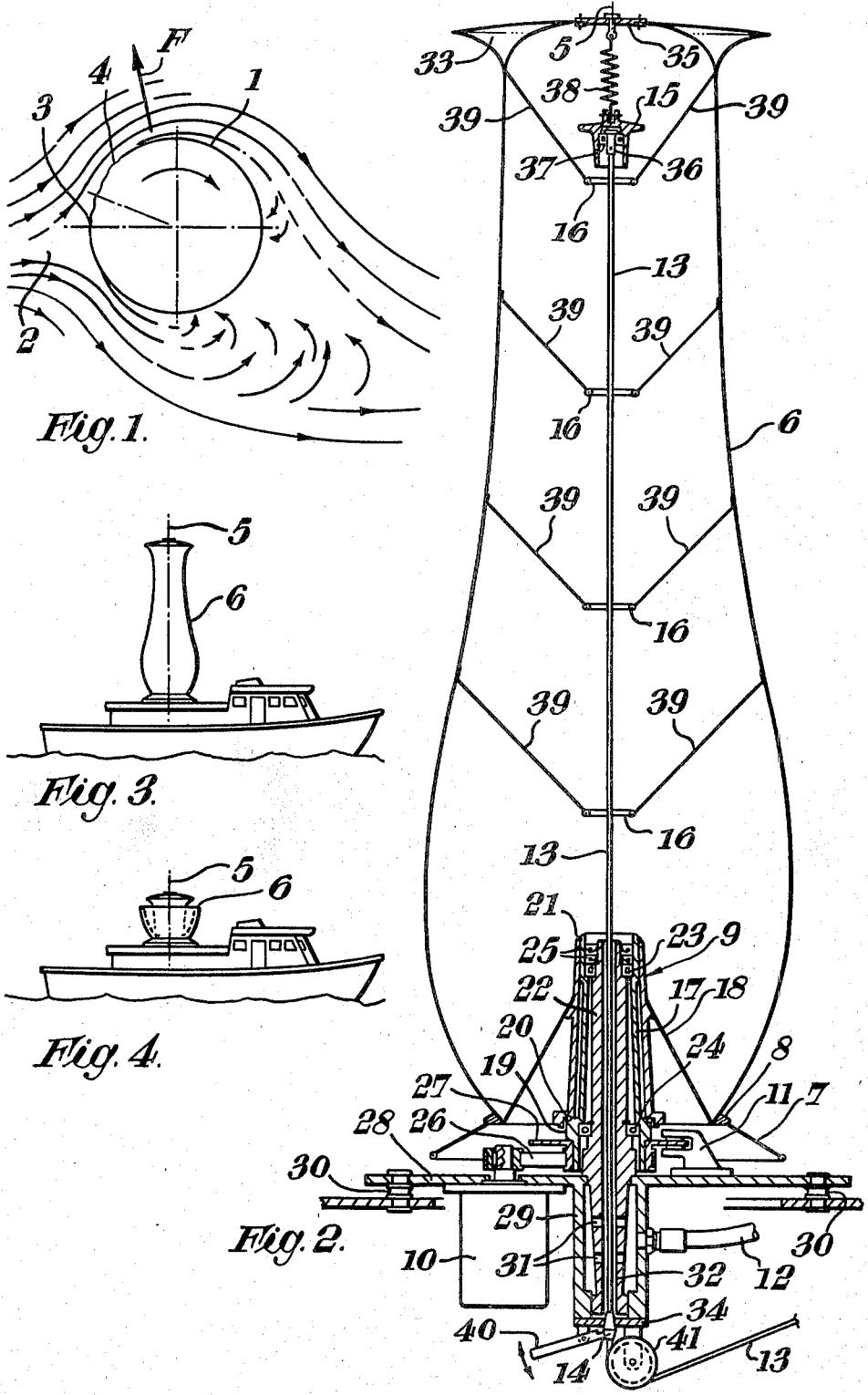

COLLAPSIBLE MAGNUS-EFFECT ROTOR

TECHNICAL FIELD

The present invention relates to aerodynamic lift producing arrangements.

BACKGROUND ART

It has long been known that a circular cylinder rotating about its central axis is capable of producing a lift force when placed in an air stream flowing normal to the axis. This lift force has a direction normal to the axis and to the free stream flow direction. The lifting effect thus produced is known as the Magnus effect after the person who first investigated the phenomenon in 1853.

The basic idea was applied to marine propulsion by Anton Flettner around 1924 but made little progress commercially owing to the unwieldy structure used and to the relatively low cost of fuel which made its application uneconomic.

SUMMARY OF THE INVENTION

According to one aspect of the invention, there is provided an aerodynamic lift producing arrangement comprising an elongate tubular envelope of flexible material and drive means for rotating the envelope about its longitudinal axis.

Preferably, said envelope is inflatable and inflation means are provided to inflate the envelope.

Said inflation means may include a compressor arranged to be driven by said drive means.

Preferably, said inflation means is arranged to inflate the envelope to an excess pressure of one pound per square inch (approx. 7 Kilopascals).

Said envelope is preferably collapsible.

There is preferably provided an elongate flexible member extending axially of and within the envelope, the flexible member being secured by bearing means to one end of the envelope and extending from the other end thereof whereby pulling of the flexible member assists collapse of the envelope.

Preferably, the envelope is mounted on a discoid support member at one end thereof, the support member being drivable by said drive means.

Said support member may have a central aperture and a hub assembly is mounted centrally on said support and extends through said aperture.

Preferably, said drive means is arranged to drive an outer part of said hub member.

Preferably, an inner stationary part of said hub assembly extends through said aperture and is secured to a base plate.

Said stationary part is preferably provided with an axial throughgoing aperture.

Preferably, said flexible member passes through said aperture.

Preferably, said inflation means are arranged to inflate the envelope by way of said aperture.

Expediently, a braking means is provided to brake rotation of the envelope.

Preferably said envelope is bulbous at one end thereof.

The envelope may be of woven material, preferably with its smoother surface innermost.

According to a further aspect of the invention, there is provided a craft, e.g. a boat, having at least one said lift producing arrangement.

BRIEF DESCRIPTION OF THE DRAWINGS

For a better understanding of the invention, and to show how the same may be carried into effect, reference will now be made, by way of example, to the accompanying drawing, in which:

FIG. 1 is a schematic explanatory diagram;

FIG. 2 shows a lift producing arrangement in longitudinal section;

FIG. 3 shows an erect lift producing arrangement mounted on a boat; and

FIG. 4 shows the boat of FIG. 3 with the lift producing arrangement in a collapsed condition.

DETAILED DESCRIPTION OF DRAWINGS

FIG. 1 shows schematically a cylinder 1 rotating clock-wise in an air stream 2. Stream lines of the flow are diverted to one side or the other of the cylinder and in the absence of cylinder rotation the flow would be entirely symmetrical. A stagnation point occurs where a cylinder diametral line parallel to the flow intersects the cylinder surface on its upstream side. The air speed over the cylinder surface would vary from zero at this stagnation point to a maximum value at the widest part of the cylinder and then reduce on the downstream side of the cylinder until the stream lines rejoined the free stream flow. From Bernoulli's theorem it is clear that the static head over the curved cylinder surface is then lower than that of the free stream by the static equivalent of the increased dynamic head at each point. Since the air flow is symmetrical, there is no net lateral force on the cylinder. However, when the cylinder 1 is rotating, the relative speed between the upper surface and the flow over the surface is lower than the corresponding relative speed between the lower surface and the flow. Consequently, the flow over the upper surface has lower Reynold's numbers than the flow over the lower surface. Thus viscous forces are more significant in determining the flow over the upper surface than over the lower surface. As a result, the upper flow tends to remain smooth and laminar whilst the lower flow has a tendency to become turbulent. This causes the region above the cylinder in FIG. 1 to assume a lower pressure than that below the cylinder, the difference providing an upward lift force F.

A more detailed investigation of the phenomenon shows that boundary layers are produced over the upper and lower surfaces of the cylinder 1. When the cylinder is not spinning, the two boundary layers have respective leading edges positioned symmetrically at respective sides of the stagnation point. As rotational speed of the cylinder is increased the stagnation point and the two leading edges progressively migrate in the direction of cylinder motion to reach a position such as shown in FIG. 1 where the leading edges are positioned at points 3 and 4. However, in a practical situation, the air stream velocity is not steady and the positions of points 3 and 4 will move, leading to fluctuations in the force F. This is a problem if it is intended to use such a rotating cylinder as a source of lift in a practical situation, for example as a rotary sail on a boat.

It has now been realised that if the cylinder is constituted as an envelope of a flexible material having a suitable modulus of elasticity movement of the boundary layer leading edges can be stabilised to some extent. The envelope can deform through localised differences between the internal and external pressure. By this means, a slight outwardly contoured ridge or standing wave may be produced at each boundary layer leading edge. As a result of inertia of the envelope material, such a ridge will tend to stabilise the position of the associated boundary layer against movement causes by irregularities in free stream velocity and will act to positively locate the boundary layer leading edge. Consequently force F becomes more stable thus giving improved performance of the arrangement as a lifting member. Because of the improved performance, the amount of input power needed to rotate the cylinder is reduced for a given thrust requirement.

Referring now to FIG. 2, a practical embodiment of such a rotary sail is illustrated. An inflated envelope 6 of impervious flexible material is bulbous at its base and relatively slim at its upper end. Such a shape offers a satisfactory compromise between aerodynamic and structural requirements. The envelope is mounted on discoid support base 7 via an air sealing ring 8. Support base 7 is mounted for rotation about an axis 5 and is coupled to a reversible drive motor 10 which may be electrical or an internal combustion engine. Suitable material for the envelope would be rubberised canvas, cotton backed P.V.C., or any other like impermeable material such as is used for manufacturing inflatable dinghies or hovercraft skirts. Preferably, where the material is a woven fabric, the warp and weft threads are aligned in such directions that lateral aerodynamic forces on the envelope 6 are transferred to base 7 with minimum distortion of the envelope 6. The thickness of the material should be sufficient to resist the static and dynamic loads but not so great that flexing in the radial direction cannot occur. When using a woven material, it is better to arrange that the smooth surface is inside and the small undulations over the warp and weft threads are on the external surface. This may provide better lift.

The support base 7 is secured to a central elongate hub assembly 9 and also to a conical support structure 18 which carries the sealing ring 8 and is secured at its upper, narrower end to assembly 9. The assembly 9 includes a tubular member 17 sitting upon a central carriage drum 19 and located in position thereupon by locating dowels 20 at the base and a circlip 21 at the upper part thereof. The carriage drum 19 is mounted for rotation upon a central axle member 22 by means of an upper roller bearing assembly 23 and a lower ball bearing assembly 24. A double seal arrangement 25 is disposed between the axle member 22 and the drum 19 above the roller bearing assembly 23 in order to prevent escape of the inflation gas from within the envelope 6. The drum 19 is driven by means of motor 10 via a toothed drive belt 26. Attached to drum 19 is an annular disc 27 which cooperates with a caliper assembly 11 to form a disc brake. Axle member 22 is supported upon a base plate 28 which also supports the motor 10 and which has a central depending tubular portion 29 surrounding and supporting the lower part of the axle member 22. The base plate 28 is supported on flexible mountings 30. Within the tubular portion 29, the lower part of axle member 22 is provided with throughgoing apertures 31 allowing communication of the exterior of axle member 22 with the interior of envelope 6 via a central bore 32 passing axially down axle member 22. A supply line 12 for pressurised gas is connected to a side wall of tubular portion 29 for supplying pressurised gas, e.g. air, to inflate the envelope 6. The bottom of portion 29 is closed by means of a plate 34 which has a central throughgoing aperture via which is cable or nylon rope 13 enters the axle member 22 and passes axially therethrough and thence upwardly through the envelope 6 to be supported by an inner bearing member 36. Bearing member 36 is supported within a ball bearing assembly 37 which is supported by a tapered swivel reel 15 suspended from a top plate 35 of the envelope by a spring 38. Where the cable 13 passes through the plate 34, it is provided with a wedge shaped collet 14 which acts as a seal. Secured to the collet 14 is one end of a deflection lever 40 which is pivotally mounted on the plate 34. The cable 13 passes over a pulley assembly 41. The envelope may be collapsed by pulling on the cable 13 which not only pulls the collet 14 from the plate 34 to allow the inflation pressure to escape from the envelope 6, but also pulls on the swivel reel 15 causing it to descend and deflate the envelope. To assist in the deflation and collapse process, a plurality of brailing rings 16, through which the cable 13 passes, are suspended internally of the envelope by flexible tapes 39. When the swivel reel 15 is pulled downwards by the cable 13, acting as a reefing line, it progressively engages the brailing rings 16 thus folding the envelope and deflating it in a controlled manner. The caliper disc brake assembly 11 is provided to minimise the time required to reverse sail direction during boat manoeuvres.

Gas line 12 may serve as a vent during deflation as well as serving as an entry line during inflation of the envelope 6.

It is possible to construct the envelope 6 with the top sealed simply by means of the envelope material. However, it is also possible, as illustrated, to construct envelope 6 as an open-ended tube and to seal the upper end by the upper plate 35 acting as a sealing member. In either case, a specially shaped end disc 33 may be provided to reduce end pressure losses and drag. A single member may function both as the upper sealing member 35 and as the shaped end disc 33.

It will be appreciated that operation of motor 10 causes the carrying drum 19 to rotate on its bearings 23 and 24, thus causing the whole envelope 6 with its support disc 7 and conical support structure 18 to rotate about its longitudinal central axis 5. It will also be apparent that the upper plate 35, spring 38 and swivel reel 15 will also rotate with the envelope but that rotation of the cable, and subsequent twisting thereof, is prevented by the provision of the bearing assembly 37 in the reel 15. The lower plate 7 is approximately one and a half times the diameter of the lower part of the envelope and serves as a cover for the disc brake assembly 11 and the belt drive from the motor 10.

If desired, by releasing or slackening the cable 13 the whole envelope structure including envelope 6, plate 7, and conical support 18 with the envelope hub 17 may be lifted from the carrying drum 19, e.g. for servicing or repair of the envelope 6.

Normally, the envelope inflation pressure will be about one pound per square inch (approx. 7 Kilopascals). A lift force of about five pounds per square foot (approx. 240 Pascals) could be expected with an envelope 6 of height twenty feet (approx. 6 meters), diameter four feet (approx. 1.2 meters) at its base and with a rotational speed of 400 R.P.M. assuming a typical wind speed of about twenty miles per hour (approx. 9 meters per second). Normally, the nominal surface speed of the envelope will be up to four times that of the free stream, although a higher or lower ratio may be optimum for certain conditions.

Inflation of the envelope may be achieved by using a pressurised cylinder of compressed air or may be achieved using a compressor which could be driven by motor 10.

Because the envelope is inflatable, it can easily be made collapsible for convenient storage in a relatively small volume in which condition it would have little windage.

Although the envelope is thus preferably an inflatable structure, this is not essential. It would equally be possible to mount a flexible outer envelope over a tubular frame. With such a sail, sealing would of course be unnecessary, but the bulkiness of the structure would render its use inconvenient. In either case, however, the advantage of light weight is attained.

It would also be possible to construct the sail as an elongate open-ended tube with each end provided with a disc support member and to erect the sail simply by moving the upper disc upwards by mechanical means e.g. using a telescopic mast. Such an arrangement might avoid the need for inflation.

FIG. 3 shows the rotary sail in an erect position on a boat and FIG. 4 shows the rotary sail in a collapsed condition on a boat.

Instead of a single rotary sail, one could provide two such sails in fore and aft positions respectively or athwartships in order to provide a degree of manoeuvrability. In the case of a catamaran, one rotary sail could be placed on each hull. With a plurality of rotary sails, it would be desirable to provide independent control of sail rotational speed and direction for differential thrust.

Clearly the ratio of lift produced to power applied to the rotary sail will vary in dependence upon various parameters, such as the length and diameter of the sail. However, it is quite practical to produce an arrangement where the ratio is several times the equivalent ratio for a conventional screw propeller.

Thus it is envisaged that a conventional motorised craft provided with a screw propeller could be additionally provided with at least one rotary sail as a supplementary thrust producing member for fuel economy purposes. The motor provided for driving the propeller could have additional transmission means for coupling it to the or each rotary sail.

As will be understood, the mechanical and structural parts of the rotary sail arrangement shown in FIG. 2, such as base 7, hub assembly 9, axel member 22 and plate 28, may be made from steel, aluminium or any other suitable structural material.

I claim:

1. Apparatus for producing aerodynamic lift comprising:
   (a) a collapsible envelope of a flexible material, adapted to be inflated to form a self-supporting tubular rotor having a rotational axis, an exterior wall of said envelope being adapted to be exposed to ambient pressure on one side and an internal pressure greater than said ambient pressure on another side to be deformable locally thereby in response to local pressure variations;
   (b) means for inflating said envelope;
   (c) means for rotating said envelope in an inflated condition about said rotational axis; and
   (d) an elongate flexible member extending axially of and within the envelope, the flexible member being secured by bearing means to one end of the envelope and extending to the other end thereof, whereby pulling of the flexible member assists collapse of the envelope.

2. Apparatus for producing aerodynamic lift comprising:
   (a) a collapsible envelope of a flexible material, adapted to be inflated to form a self-supporting tubular rotor having a rotational axis, an exterior wall of said envelope being adapted to be exposed to ambient pressure on one side and an internal pressure greater than said ambient pressure on another side to be deformable locally thereby in response to local pressure variations;
   (b) means for inflating said envelope;
   (c) means for rotating said envelope in an inflated condition about said rotational axis;
   (d) a discoid support member which is rotatable by said means for rotating said envelope and on which one end of the envelope is mounted, the support member having a central aperture;
   (e) a hub assembly mounted centrally on said support member and extending through said aperture;
   the means for rotating said envelope constituting drive means for driving an outer part of said hub assembly; and
   (f) a base plate to which is secured an inner stationary part of said hub assembly which extends through said aperture, the stationary part having an axial aperture extending therethrough;
   said inflation means communicating with the envelope by way of the axial aperture.

3. Apparatus for producing aerodynamic lift comprising:
   (a) a collapsible envelope of a flexible material, adapted to be inflated to form a self-supporting tubular rotor having a rotational axis, an exterior wall of said envelope being adapted to be exposed to ambient pressure on one side and an internal pressure greater than said ambient pressure on another side to be deformable locally thereby in response to local pressure variations;
   (b) means for inflating said envelope;
   (c) means for rotating said envelope in an inflated condition about said rotational axis;
   (d) a discoid support member which is rotatable by said means for rotating said envelope and on which one end of the envelope is mounted, the support member having a central aperture;
   (e) a hub assembly mounted centrally on said support member and extending through said aperture;
   the means for rotating said envelope constituting drive means for driving an outer part of said hub assembly;
   (f) a base plate to which is secured an inner stationary part of said hub assembly which extends through said aperture, the stationary part having an axial aperture extending therethrough; and
   (g) an elongate flexible member extending through said axial aperture and along said rotational axis of said envelope, one end of said flexible member being secured to an end of said envelope remote from said discoid support member.

* * * * *